Oct. 5, 1971                A. DRITZ                3,610,087
STAPLE WITH INHERENT MEANS FOR MANUALLY DETACHING THE SAME
Filed July 7, 1969                          5 Sheets-Sheet 1

INVENTOR
ARTHUR DRITZ
BY
James A. Franklin
ATTORNEY

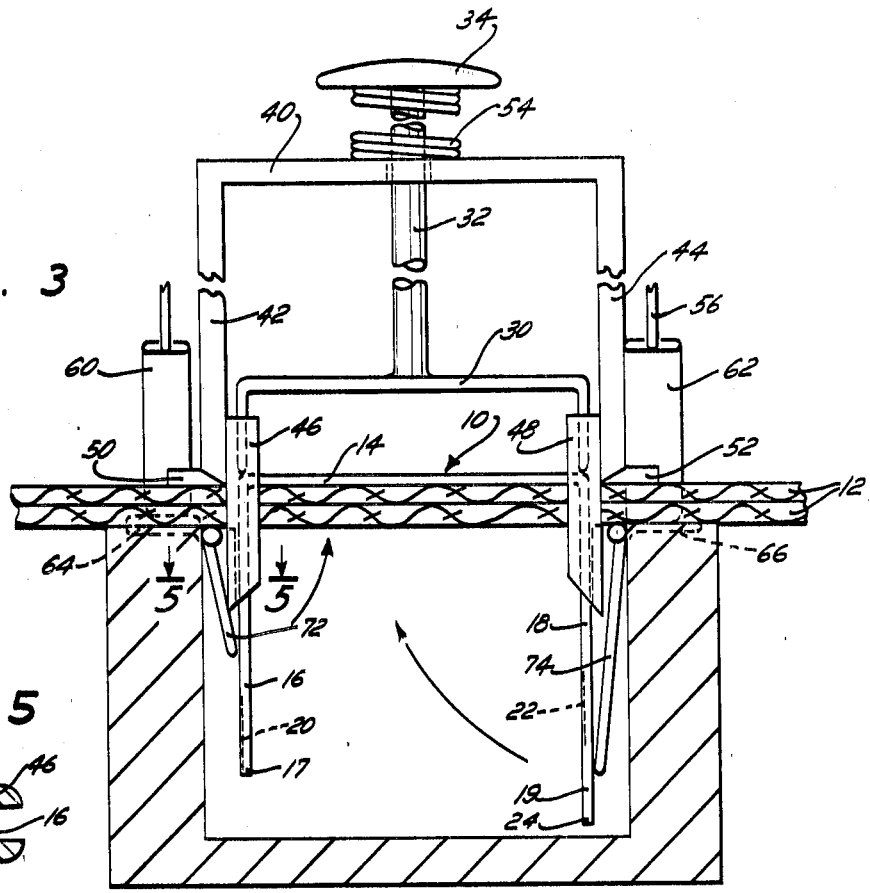
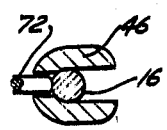
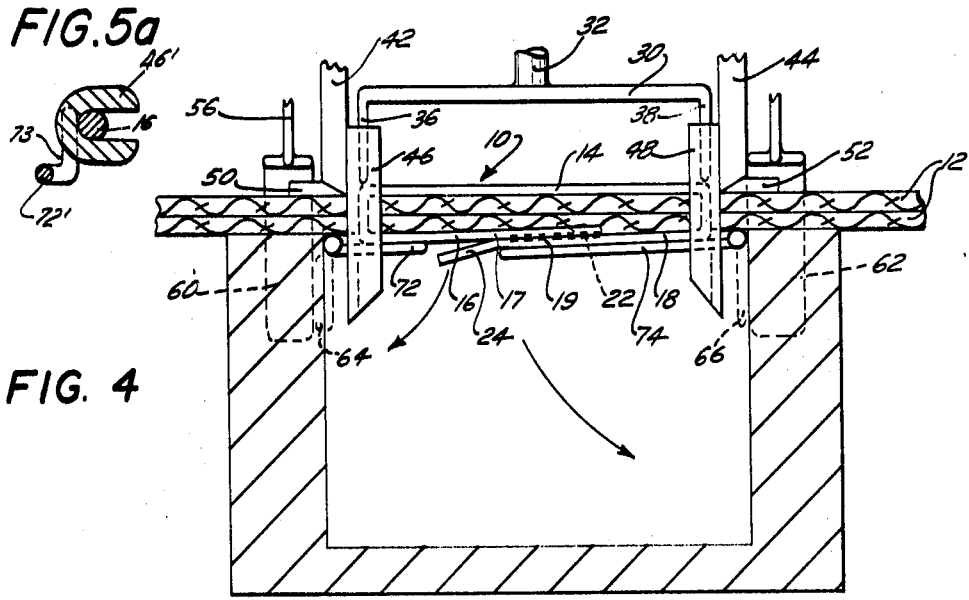

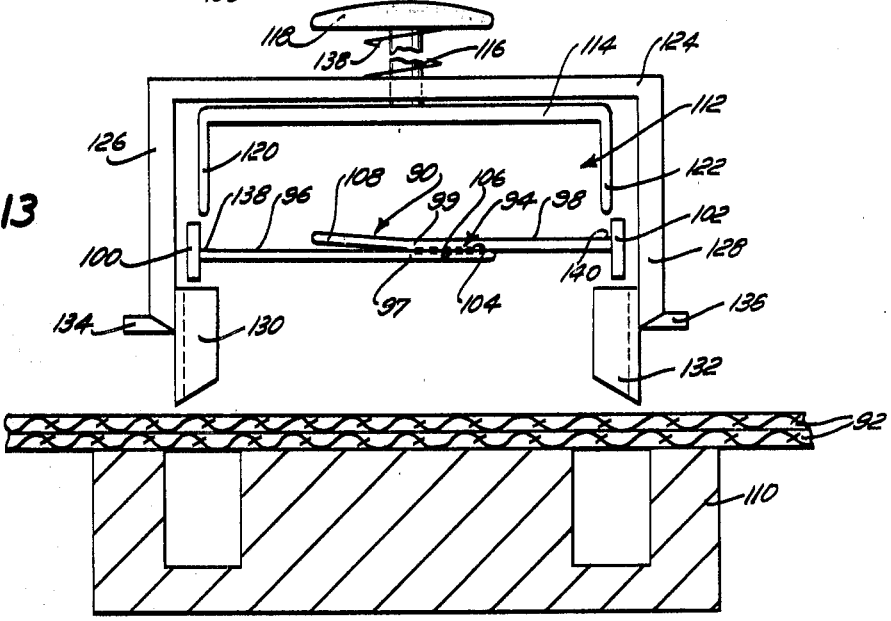
FIG. 12
FIG. 13
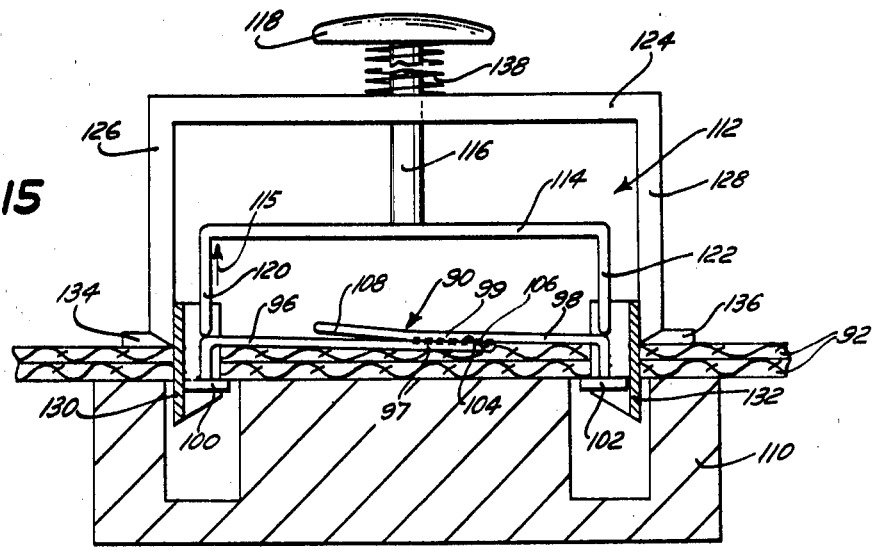
FIG. 15
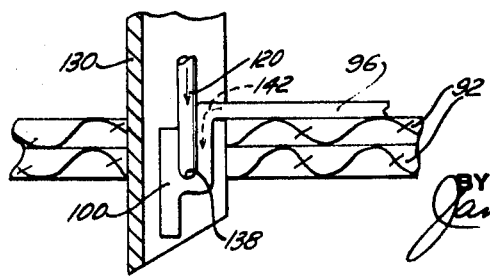
FIG. 14

Oct. 5, 1971   A. DRITZ   3,610,087
STAPLE WITH INHERENT MEANS FOR MANUALLY DETACHING THE SAME
Filed July 7, 1969   5 Sheets-Sheet 5
FIG. 16
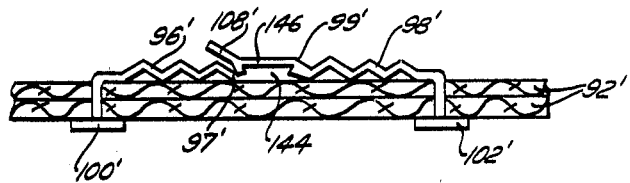
FIG. 17
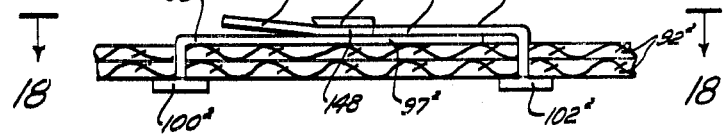
FIG. 18
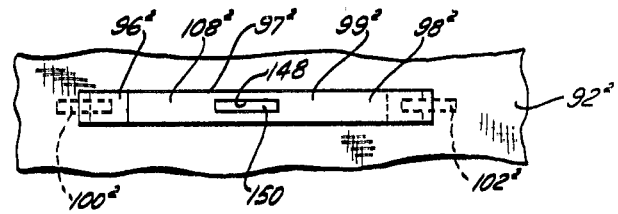
FIG. 19
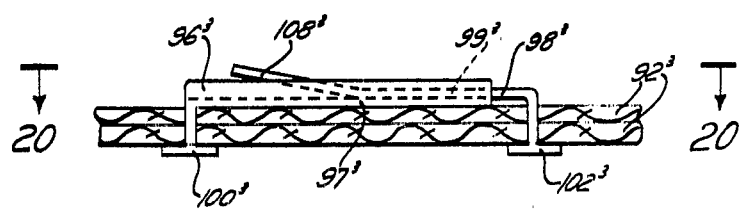
FIG. 20
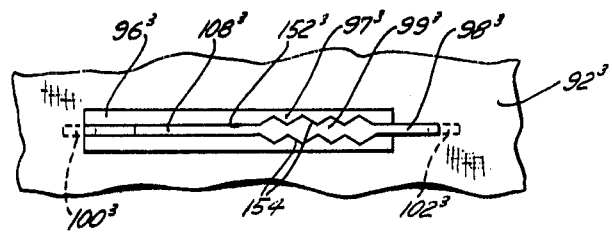
FIG. 21
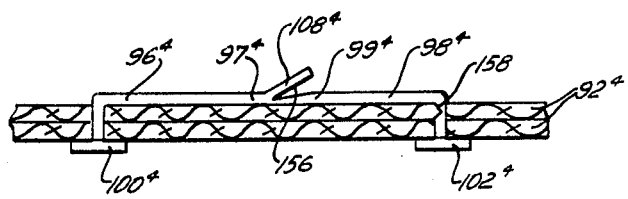
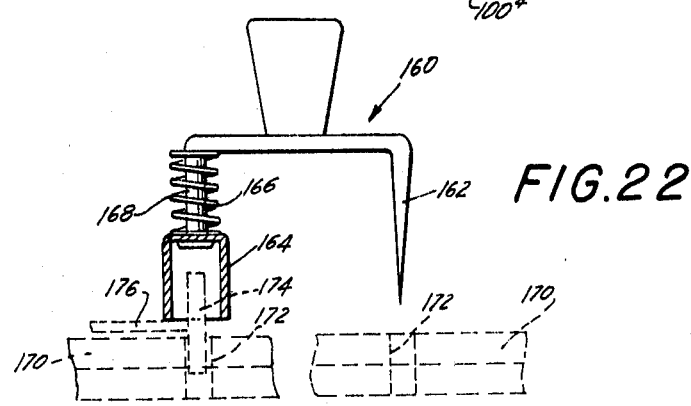
FIG. 22
INVENTOR
ARTHUR DRITZ
BY James R. Franklin
ATTORNEY United States Patent Office 3,610,087
Patented Oct. 5, 1971

3,610,087
STAPLE WITH INHERENT MEANS FOR
MANUALLY DETACHING THE SAME
Arthur Dritz, 171 Beach 125th St.,
Rockaway Park, N.Y. 11694
Filed July 7, 1969, Ser. No. 839,161
Int. Cl. A43d 69/06; F16b 15/00
U.S. Cl. 85—49                                   1 Claim

ABSTRACT OF THE DISCLOSURE

A staple for uniting together sheets or layers of paper, fabric or like substrates, the staple being made of a flexible material, the staple being provided with inherent or integral means for manually detaching the staple from its sheet uniting condition. The staple is disclosed as embodied in a wrap-around type and in a bar-lock type of staple provided with lapping sections which are bonded together, the bond of which is broken for staple detachment by the manual operation of the inherent detaching means.

This invention relates to staples for uniting together sheets or layers of paper, fabric and the like and provided with inherent means for manually detaching the staples from their sheet uniting condition.

The most commonly used staple comprises a U-shaped member made of a stiff metallic material, the legs of which are forced by the hammer of a stapling machine to penetrate the sheets and are then bent under pressure by the anvil of the machine into an attached and sheet uniting condition. Such staples are difficult to detach or remove from their attached condition without the aid of mechanical devices which, however, are not always on hand, and which are difficult to operate when a large number of sheets are united by staples necessarily made of heavier metal stock.

These difficulties are also experienced with the use of staples made of flexible rubber and rubber-like plastic materials such as natural rubber, vinyl compounds, polyethylene, nylon and the like, operated upon by suitable staplers to unite paper and fabric sheets and substrates. Such staples are difficult to remove or detach from their sheet uniting state, particularly when the rubber or plastic material used has some elasticity or has a high tear resistant value or both.

The prime object of my present invention centers about the provision of a staple made of flexible rubber and rubber-like plastic materials, or also of suitable metal stock, in which the staple is formed with an inherent or integral means adapted to be grasped and pulled by the user for permitting manual detachment or removal of the staple from its sheet united condition.

To the accomplishment of the foregoing object and such other objects as may hereinafter appear, my invention relates to the staple as defined in the appended claims taken together with the following specification and the accompanying drawings in which:

FIG. 3 is a view of the stapler of FIG. 2 depicting the same in an intermediate operated position;

FIG. 4 is a view of the stapler showing the operating parts thereof in a final stage of operation;

FIG. 5 is a view of a detail taken in cross section in the plane of the line 5—5 of FIG. 3;

FIG. 5a is a view of a modification of the detail of FIG. 5;

in FIG. 1 staple parts are bonded by an adhesive or fused bond whereas in FIG. 6, such staple parts are bonded by a mechanical or interlocking bond;

FIG. 12 is an elevational view, partly in section, of another embodiment of the staple of my invention in the form of a bar-lock type of staple showing the same applied in sheet uniting condition;

FIG. 13 is a front elevational view of the operated parts of a stapler for applying the bar-lock staple of FIG. 12 depicting the same in an initial stage of its operation;

FIG. 14 is a fragmentary view of FIG. 13 showing operated parts in an intermediate position of operation;

FIG. 15 is a view of the stapler of FIG. 13 showing the same in a final stage of its operation;

FIG. 16 is a view similar to FIG. 12; in FIG. 12 staple parts are bonded by an adhesive or fused bond whereas in FIG. 16 such staple parts are bonded by a mechanical or interlocking bond;

FIG. 17 is a view of a modification of the staple of FIG. 16 showing a different form of mechanical bond for the staple parts;

FIG. 18 is a top plan view of FIG. 17 taken in the plane of the line 18—18 of FIG. 17;

FIG. 19 is an elevational view, partly in section, of the bar-lock type of staple with the mechanical bond showing a further modification thereof;

FIG. 20 is a plan view of FIG. 19 taken in the plane of the line 20—20 of FIG. 19;

FIG. 21 is an elevational view, partly in section, of a further modification of the bar-lock type of staple of the invention; and FIG. 22 is a view of a modified form of stapler for applying a bar-lock staple.

Figures 1, 2:
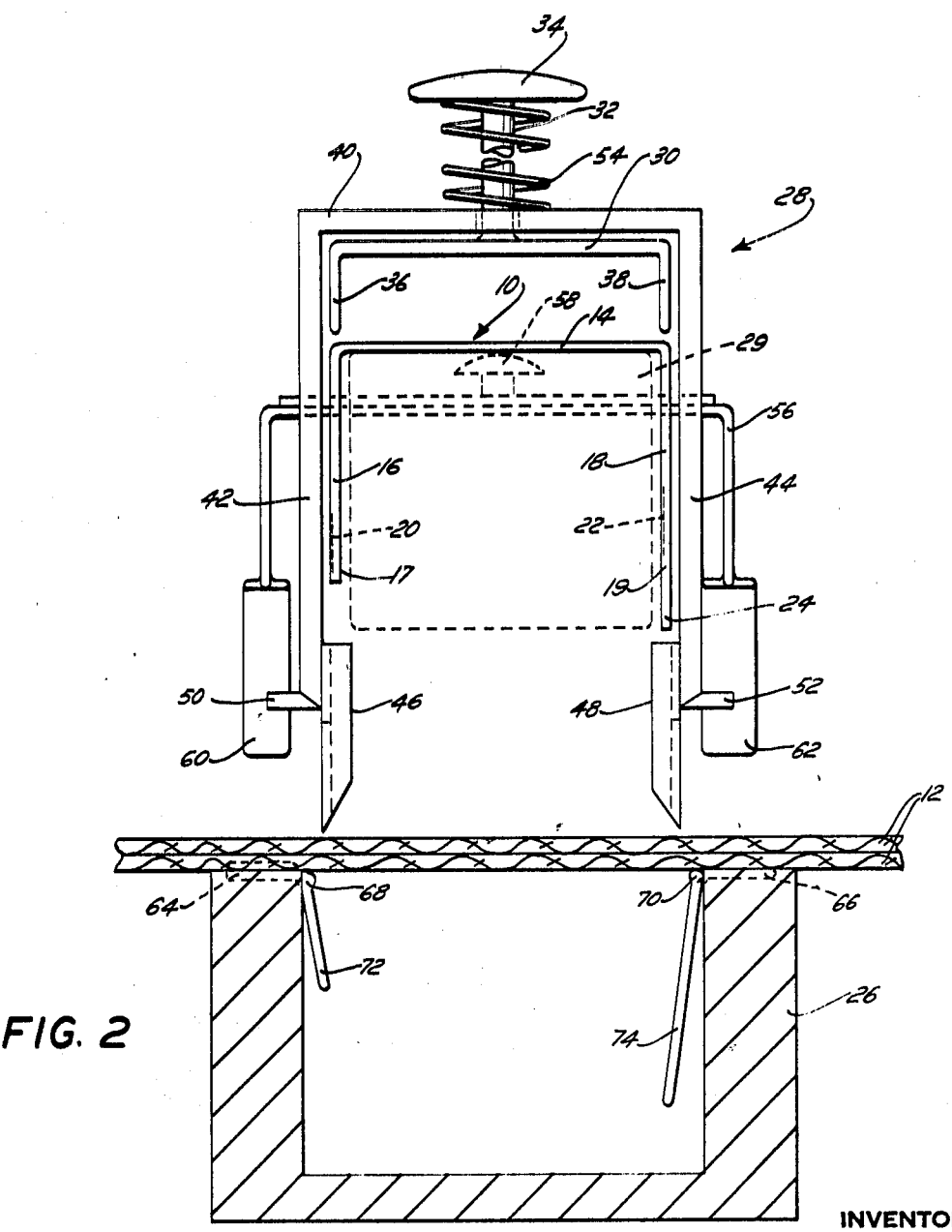
FIG. 1 is an elevational view, partly in section, of one embodiment of the staple of my invention in the form of a wrap-around type of staple showing it in applied or sheet uniting condition.
FIG. 2 is a front elevational view of the operated parts of a stapler machine for applying the staple of FIG. 1, depicting the operation in an initial stage thereof.

Referring now more in detail to the drawings and having reference first to FIG. 1 thereof, the staple of my invention generally designated as 10 is shown embodied in the form of a wrap-around type of staple uniting a plurality of sheets or layers 12 of paper, fabric and the like. This staple embodiment comprises in its initial form an inverted U-shaped staple member made of a flexible and resilient rubber or rubber-like plastic material having a transverse part 14 and legs 16 and 18 which legs are bendable into the wrap-around form to sheet uniting condition as depicted in FIG. 1 of the drawings. In this form of the staple, the legs 16 and 18 are formed to provide lapping sections 17 and 19, preferably arranged in overlapping relation, the said lapping sections being bonded together by an adhesive bond formed by adhesive coatings 20 and 22 applied to the lapping sections or by having these lapping sections heat-fused together.

The staple 10 is provided with inherent means for manually detaching the staple from its sheet-uniting condition depicted in FIG. 1, such means comprising forming in at least one of the staple legs, and preferably in the overlapping leg 18 where the legs are arranged in overlapping condition, with a free or non-bonded extension 24 defining a pull-tab adapted to be manually grasped by the user and pulled for breaking the bond 20, 22, separating the leg 18 from the leg 16 and thereby readily permitting the detachment of the staple from its sheet uniting condition.

In FIGS. 2 to 5 of the drawings I show the operating end of a stapler machine for attaching the staple 10 to a plurality of sheets or substrates for uniting the latter. The stapler comprises a base frame 26 carrying the stapler operating parts generally designated as 28 at the forward end of the stapler machine. A group of U-shaped staples are joined to one another by an adhesive and fed through a customary type of pivoted feed track 29 in which the forward-most staple 10 is moved to a position for being operated upon by the mechanism depicted in FIGS. 2 to 5 of the drawings.

For a staple made of a flexible and resilient material such as rubber and rubber-like plastic materials wherein the staple parts, while somewhat rigid, are not rigid enough to penetrate the paper or fabric sheets to be united, means must be provided to effect sheet penetration and to coordinate the same with means for moving the staple through the sheet stock. Such coordinated means comprises, in the form of the structure shown in FIGS. 2 to 5, an inverted U-shaped staple hammer 30 provided with an extended stem 32 surmounted by a hand knob 34, the hammer 30 having depending legs 36 and 38 for engaging the staple 10 at the staple legs 16 and 18 for effecting the staple movement. Coordinated with the said hammer 30 is an inverted U-shaped frame 40 to the legs 42 and 44 of which are attached the sheet penetrating elements in the form of channelled needles 46 and 48. The legs 42 and 44 of the frame 40 are also provided at their bottom with feet 50 and 52 serving as stop elements in the manner presently to be explained. To the top of the frame 40 is attached a spring 54 encircling the stem 32.

With these described parts the operations depicted in FIGS. 2 and 3 may now be explained. Upon depression of the hand knob 34, the hammer 30 is moved, against the action of (and partly compressing) the spring 54, thereby moving the hammer 30 into engagement with the staple 10 whereby the legs 16, 18 of the staple are moved into the channelled needles 46, 48. At a point in the compression of the spring 54, continued pressure applied to the hand knob 34 now actuates the frame 40 via the spring, thereby moving the frame 40 from the position shown in FIG. 2 to the position shown in FIG. 3, the frame 40 being stopped in the FIG. 3 position by engagement of its feet 50 and 52 with the supported sheets 12. At this point of operation the sheet penetrating channelled needles 46 and 48 have been moved to the position shown in FIG. 3 into sheet penetrated positions. Upon continued pressure applied to the knob 34, the spring 54 is now further compressed for effecting movement of the hammer 30 to the position shown in FIG. 3 thereby effecting the final movement of the staple 10 through the channelled needles 46 and 48 and to the position depicted in FIG. 3.

The stapler machine is additionally provided with mechanism for inturning the staple legs 16 and 18 and for bonding these legs together to the condition depicted in FIG. 4 of the drawings. This is accomplished by the provision of the following mechanism: an inverted U-shaped device 56 mounted and guided at the rear of the staple moving mechanism and depressible by means of a finger knob 58 is independently movable from the position shown in FIG. 2 through the positions shown in FIGS. 3 and 4. This device 56 has bottom drive members 60 and 62 which engage bars 64 and 66 fixed to spring loaded or torsion rods 68, 70 extending the length of the machine. The forward ends of said rods are provided with the swinging arms 72 and 74, oscillatable in the arrow indicated directions, these arms being arranged in the plane of the staple legs 16, 18. When the device 56 reaches the position shown in FIG. 3, the drive members 60 and 62 thereof engage and move the bars 64 and 66 from the position shown in FIG. 3 to that shown in FIG. 4 thereby swinging the arms 72 and 74 inwardly to the position shown in FIG. 4 resulting in the inbending of the staple legs 16 and 18 and the bonding of the lapping or overlapping sections 17 and 19 of these legs together as depicted in FIG. 4 and as discussed with FIG. 1 of the drawings.

It will be noted that in this latter operation the swinging arms 72 and 74 are capable of moving through the channelled needles for engaging the staple legs due to the structure of the needles as best shown in FIG. 5 of the drawings. In the alternative form of FIG. 5a, to maintain the strength of the needle 46', the swinging arm, such as 72', is offset and formed with a finger 73 extending below the needle 46' for engaging the staple leg 16. The lengths of the swinging arms 72 and 74 and the positioning of the bars 64 and 66 are so determined as to cause the staple legs 16 and 18 to be moved in sequence and to overlap in the manner described. While for simplicity of illustration I show the device 56 operated by a separate knob 58, it will be understood that this device may be operated by the rear part of the referred to pivoted feed track and thereby operated directly by the hand knob 34. All of the operated parts may be returned to their initial positions by a return movement of the knobs 34 and 58 (assisted as is customary in staplers by a spring acting on the pivoted feed track).

In FIGS. 6 to 11 I show a number of modifications of the FIG. 1 wrap-around type of staple of the invention in applied or sheet uniting condition. In these figured modifications, the parts similar to those of FIG. 1 are designated by the same reference characters with exponents, however, corresponding to the number of the modification. Thus, in the first modification, FIGS. 6 and 7, the parts are designated with the same reference characters used with FIG. 1, having, however, a primed or number "one" exponent, etc.

In all of the three modified forms of the staple shown respectively in FIGS. 6 and 7, 8 and 9 and 10 and 11 of the drawings, the lapping sections of the staple legs are bonded together by a mechanical or interlocking bond as distinguished from the form of staple shown in FIG. 1 where these sections are bonded together by an adhesive or a heat-fused bond.

Figure 6:
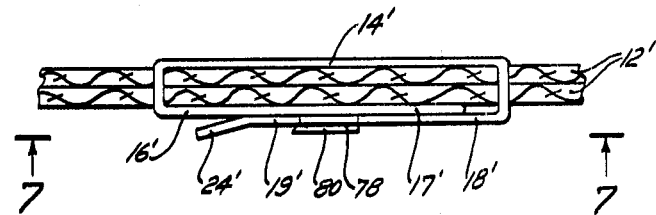
FIG. 6 is an elevational view, partly in section, showing a modified form of the staple of FIG. 1.
Figure 7:
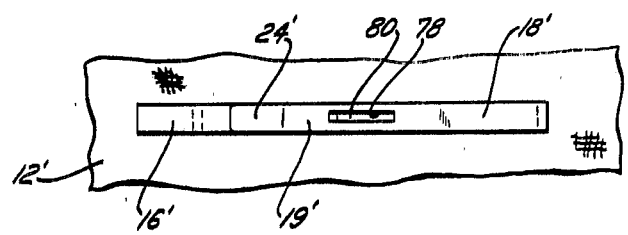
FIG. 7 is a bottom plan view of the applied staple of FIG. 6 taken in the plane of the line 7—7 of FIG. 6.

Thus, in FIGS. 6 and 7, the lapping sections 17' and 19' of the staple legs 16' and 18' are mechanically bonded by a slot 78 formed in the section 19' and a key 80 undercut at one end formed in the section 17'; the lapping sections are interlocked by friction pressure between the key and the slot and by undercut arrangement, which interlock may be readily disengaged by manually lifting the pull-tab 24'.

Figure 8:
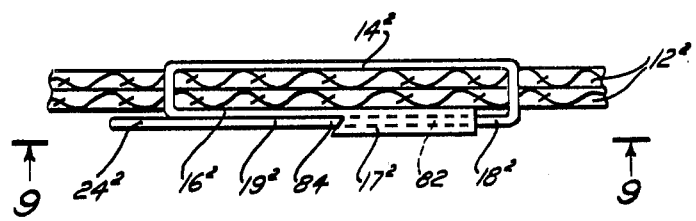
FIG. 8 is an elevational view, also partly in section, showing a modification of the mechanically bonded staple of FIG. 7.
Figure 9:
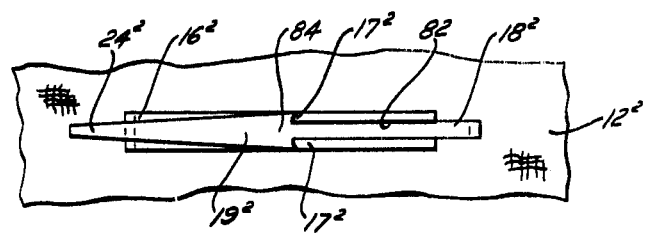
FIG. 9 is a bottom plan view of the staple of FIG. 8 taken in the plane of the line 9—9 of FIG. 8.

In FIGS. 8 and 9, the lapping sections $17^2$ and $19^2$ are mechanically bonded by a keyway 82 formed in the section $17^2$ undercut at one end, frictionally receiving an arrowed part 84 of the section $19^2$; the lapping sections thereby interlocked may be readily disengaged by manually lifting the pull tab $24^2$.

Figure 10:
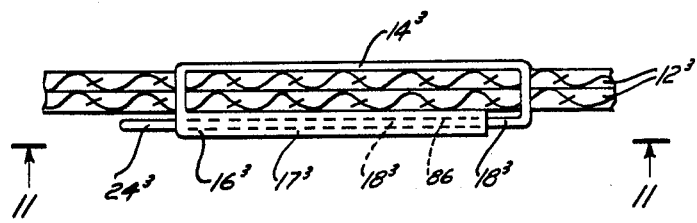
FIG. 10 is an elevational view, partly in section, of a further modification of the mechanically bonded staple of FIGS. 6 to 9.
Figure 11:
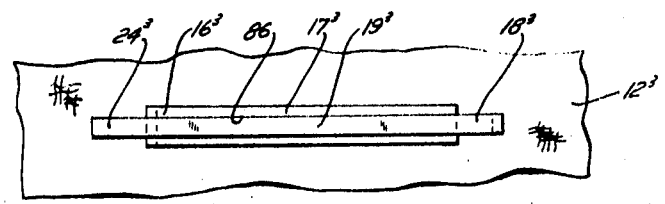
FIG. 11 is a bottom plan view of the staple of FIG. 10 taken in the plane of the line 11, 11 of FIG. 10.

In FIGS. 10 and 11, the lapping sections $17^3$ and $19^3$ are mechanically bonded by an extended slot or keyway 86 formed in the section $17^3$ frictionally receiving the section $19^3$ throughout its length, assisted if desired by an adhesive attachment therebetween; the interlocked lapping sections being readily disengageable by manually lifting the pull-tab $24^3$.

Referring now to FIG. 12 of the drawings, the staple of the invention, here generally designated at 90, is shown embodied in the form of a bar-lock type of staple uniting a plurality of sheets or layers 92 of paper, fabric and the like. This staple embodiment comprises in its initial form (see FIG. 13) a filament body 94 having leg parts 96 and 98 which terminate in the bar elements 100 and 102, made of a flexible and elastic (stretchable) rubber or plastic material. Such a staple when applied for uniting together the sheets 92 takes the form depicted in FIG. 12 of the drawings.

In this form of the staple of the invention, the legs 96 and 98 are formed to provide lapping sections 97 and 99, preferably arranged in overlapping relation, the said lapping sections in the embodiment of FIG. 12 being bonded together by an adhesive bond formed by coatings 104 and 106 applied to the lapping sections or by having these lapping sections heat-fused together. The inherent means for manually detaching this staple from its sheet uniting condition comprises forming in at least one of the staple legs, and preferably in the overlapping leg 98, a free or non-bonded extension 108 defining the pull-tab adapted to be manually grasped by the user and pulled for breaking the bond 104, 106, separating the leg 98 from the leg 96 and thereby permitting the detachment of both legs of the staple from sheet uniting condition.

In FIGS. 13 to 15 of the drawings I show the operating end of a stapler machine for attaching the staple 90 to a plurality of sheets or substrates for uniting the latter. The stapler comprises a base frame 110 carrying the stapler operating parts generally designated as 112 at the forward end of the stapler machine. A group of bar-lock staples 90 are joined to one another by an adhesive and fed through a customary type of pivoted feed track (as heretofore referred to in connection with FIGS. 2 to 5) in which the forwardmost staple 90 is moved to a position for being operated upon by the mechanism depicted in FIGS. 13 to 15 of the drawings.

For a staple having the characteristics of flexibility and stretchability, (in which the legs are not rigid enough to penetrate the paper or fabric sheets to be united), means must be provided (as in the stapler previously described) to effect sheet penetration and such means must be coordinated with means for moving the staple to its sheet applied condition. Such coordinated means comprises (similar to the structure heretofore described) an inverted U-shaped staple hammer 114 provided with an extended stem 116 surmounted by a hand knob 118, the hammer having depending legs 120 and 122 for engaging the staple 90 at the staple legs 96 and 98 for effecting the staple movement. Coordinated with said hammer 114 is an inverted U-shaped frame 124, to the legs 126 and 128 of which are attached sheet penetrating elements in the form of channelled needles 130 and 132. The legs 126 and 128 of the frame 124 are also provided at their bottom with feet 134 and 136 serving as stop elements. To the top of the frame 124 is attached a spring 138 encircling the stem 116.

With these described parts the operations depicted in FIGS. 13 to 15 may now be explained. Upon depression of the hand knob 118 the hammer 114 is moved against the action of (and partly compressing) the spring 138, thereby moving the hammer legs 120, 122 into engagement with the staple legs 96, 98 at points 138, 140 astride the bars 100 and 102, whereby the legs 96, 98 of the staple are moved into the channelled needles 130 and 132. In this phase of the operation the hammer legs become lodged between the bars and the legs of the staple as best shown in FIG. 14 of the drawings, the staple legs being stretched in this operation as indicated by the arrow 142 in FIG. 14.

In the continued operation of this stapler, at a point in the compression of the spring 138 continued pressure applied to the hand knob 118 now actuates the frame 124 via the spring 138, thereby moving the frame from the position shown in FIG. 13 to that shown in FIG. 15, the frame being stopped in the FIG. 15 position by the engagement of its feet 134, 136 with the supported sheets 92. At this point of the operation the sheet penetrating needles 130 and 132 will have been moved to a position as shown in FIGS. 14 and 15 into sheet penetrating positions.

FIGS. 14 and 15 also illustrates the results of the next operating phases of the stapler. First, in the continued pressure applied to the knob 118, further compressing the spring 138, movement of the hammer legs 120, 122 pushes the bars 100 and 102 and draws the staple legs through the channelled needles and through the now penetrated sheets 92 to a position where the flexible and resilient bars 100 and 102 assume the bar locking positions shown in FIG. 15 of the drawings. Second, of all the operated parts of the machine may now be returned to their initial positions by a return movement of the knob 118, assisted as is customary in staplers, by a spring active on the pivoted feed track carrying the stapled group referred to, the parts first moving through the position shown in FIG. 15 (the hammer 114 moving in the direction of the arrow 115) and then to the start position shown in FIG. 13.

In FIGS. 16 to 21 I show a number of modifications of the FIG. 12 bar-lock type of staple of the invention in applied or sheet uniting condition. In these modifications, the parts similar to those of FIG. 12 are designated by the same reference characters, using exponents, however, corresponding to the number of the modification. Thus in the first modification, FIG. 16, the parts are designated with the same reference characters used in FIG. 12 having, however, a primed or No. "1" exponent, etc.

In all of the four modified forms of the staple shown respectively in FIGS. 16, 17 and 18, 19 and 20, and 21 of the drawings, the lapping sections of the staple legs are bonded together by a mechanical or equivalent bond as distinguished from the form of the staple shown in FIG. 12 where these sections are bonded together by an adhesive or a heat-fused bond.

Thus in FIG. 16, the lapping sections 97' and 99' are mechanically bonded by a key 144 and a keyway 146 formed respectively in the lapping sections 97' and 99'. In this form of the staple the legs 96' and 98' are also preferably corrugated as shown for adding flexibility and stretch. With this structure the overlapping sections may be readily disengaged by manually lifting the pull tab 108', whereupon the parts of the staple may then be readily removed.

In FIGS. 17 and 18 the lapping sections $97^2$ and $99^2$ are mechanically bonded by a slot 148 formed in the section $99^2$ and a key 150 undercut at one end formed in the section $97^2$; the overlapping sections are interlocked by friction pressure between the key and the slot, assisted by the undercut in the key, which interlock may be readily disengaged by manually lifting the pull tab $108^2$.

In FIGS. 19 and 20 the lapping sections $97^3$ and $99^3$ are mechanically bonded by an extended slot or keyway 152 formed in the section $97^3$ frictionally receiving the section $99^3$ throughout its length, assisted by corrugations 154 formed both in the slot 152 and in the body of the section $99^3$. The interlocked lapping sections of this modification are readily disengageable by manually lifting the pull tab $108^3$.

In the structural staple form shown in FIG. 21 the sections $97^4$ and $99^4$ are integrally bonded together but cut so as to provide a weakened bond 156 therebetween which may be broken by manually lifting the pull tab $108^4$. It may also be desirable in this structural form to provide a weakened part of the staple as at 158 of a staple leg adjacent a bar such as $102^4$ whereby removal may be effected by using the bar as a pull tab for detaching the bar from its staple leg.

In FIG. 22, I show a modified form of a stapler mechanism for applying a bar-lock type of staple, in which the channelled needles such as 130 (of the stapler shown in FIGS. 13 to 15) are replaced with a needle point penetrator. This modified form of stapler requires two successive operations, the first for effecting the penetration of the paper or fabric sheets and the second for drawing the staple legs (and bars) through the penetrated sheets. The structural principles of this stapler mechanism is illustrated by the provision of a hand depressible device 160, for each side of the staple, provided at one side with a needle point leg 162 and at its other side with a sleeve 164 spring loaded by the spring 166 encircling the hammer leg 168. The device 160 is movable translationally with reference to the sheets 170 between a position where on depression of the device, the pin point leg 162 penetrates the sheets to produce the opening 172, and a position where on an initial depression of the device, the bar 174 of the staple 176 is received by the sleeve 164 and upon a final depression the hammer leg 168 operates upon the staple bar to move the staple to its sheet applied position.

The staple of the invention, the manner of its use, and the advantages thereof will, it is believed, be fully apparent from the above detailed description of its structure and functioning and of the staplers employable for its attachment to sheets or layers of paper, fabric and like substrates. The staple in all its described forms is made of a flexible material which would normally be difficult to detach from its sheet applied state, particularly when made of resilient and elastic materials such as rubber and rubber-like plastics. The wrap-around type of staples embodied in FIGS. 1 to 11 and the bar-lock type of staples embodied in FIGS. 12 to 21 of the drawings are structured to provide in its applied or stapled condition lapping, and preferably overlapping sections, exemplified by sections 17 and 19 of FIG. 1, which are bonded together, either adhesively as in FIG. 1, or mechanically as in FIGS. 6 to 11. This bond is adapted to be broken, for effecting a rupture and separation of the bonded sections and for consequent detachment or removal of the staple from its applied condition, by the manual engagement and pulling of a pull-tab, illustrated by the tab 24 of the FIG. 1 form of the invention, inherent in the structure of the staple and shown integral with one of the lapping sections of the staple. It will be understood that the principles of the invention may be applied to different types of staples, those herein disclosed being illustrated in scope of the application of these principles. Also modifications may be made in the staple structure and arrangement of the parts thereof disclosed; for example, the bonded lapping of sections while shown in overlapping arrangement may be lapped in abutting relation instead. Other obvious variations may be made within the scope of the invention defined in the following claims.

I claim:

1. A staple uniting together sheets or layers of paper, fabric and the like and provided with inherent means for manually detaching the staple from its sheet uniting condition comprising a staple member made of a flexible and resilient material, the legs of which are bent in a wrap-around form to sheet uniting condition, said legs comprising inner and outer overlapping sections in stapled condition, substantial lengthwise portions of said overlapping sections being disposed in generally parallel juxtaposed relationship and being bonded to one another, one of said overlapping sections being formed with a free non-bonded extension of appreciable length defining a pull tab, said pull tab overlapping said other section but being unsecured thereto and adapted to be manually grasped and pulled for detaching the staple from its sheet uniting condition.

References Cited

UNITED STATES PATENTS

| | | | |
|---|---|---|---|
| 1,909,654 | 5/1933 | Brown et al. | 24—153 UX |
| 2,192,423 | 3/1940 | Ward et al. | 24—17.1 X |
| 3,319,863 | 5/1967 | Dritz | 227—71 |
| 3,372,438 | 3/1968 | Rinecker | 24—16 |

FOREIGN PATENTS

| | | | |
|---|---|---|---|
| 1,065,951 | 1/1954 | France | 85—49 |
| 394,334 | 6/1933 | Great Britain | 24—153 |

RAMON S. BRITTS, Primary Examiner

U.S. Cl. X.R.

24—67; 227—71